United States Patent [19]

Beauducel et al.

[11] Patent Number: 4,918,666

[45] Date of Patent: Apr. 17, 1990

[54] TUBULAR PIEZO-ELECTRIC SENSOR WITH HIGH SENSITIVITY

[75] Inventors: Claude Beauducel, Henonville; Etienne Bolze, Rueil-Malmaison, both of France

[73] Assignee: Institut Francais du Petrole, Rueil Malmaison, France

[21] Appl. No.: 288,099

[22] Filed: Dec. 22, 1988

[30] Foreign Application Priority Data

Dec. 30, 1987 [FR] France .................. 87 18357

[51] Int. Cl.⁴ .............................................. G01V 1/38
[52] U.S. Cl. ..................................... 367/15; 367/166; 367/169; 367/171; 367/172; 310/337; 310/800
[58] Field of Search ............... 367/169, 166, 165, 167, 367/15, 171, 172, 154; 310/800, 337

[56] References Cited

U.S. PATENT DOCUMENTS

| | | | |
|---|---|---|---|
| 3,375,489 | 3/1968 | Kompanek | 367/167 |
| 3,798,474 | 3/1974 | Cassand et al. | 367/169 |
| 4,186,323 | 1/1980 | Cragg et al. | 310/800 |
| 4,706,229 | 11/1987 | Congdon | 367/169 |
| 4,716,556 | 12/1987 | Raskin et al. | 367/169 |
| 4,768,173 | 8/1988 | Gautier et al. | 367/169 |

Primary Examiner—Deborah L. Kyle
Assistant Examiner—J. Woodrow Eldred
Attorney, Agent, or Firm—Antonelli, Terry & Wands

[57] ABSTRACT

A tubular piezo-electric sensor has at least one sensitive element disposed against an outer surface of a tubular support. A substance whose acoustic impedance is very different from that of the material forming the tubular support is disposed therein and a remaining volume of the tubular support is filled with liquid. Glass fiber cords or open cell foams, for example, are used as the substance, and the liquid may, for example, be that which fills a seismic streamer and, in this case, the tubular support is left open. The tubular support may also be closed at both ends by sealed caps and included in a protective sheath. The dimensions of the tubular support and the material from which it is made are chosen so as to optimize the sensitivity of the piezo-electric sensor.

12 Claims, 1 Drawing Sheet

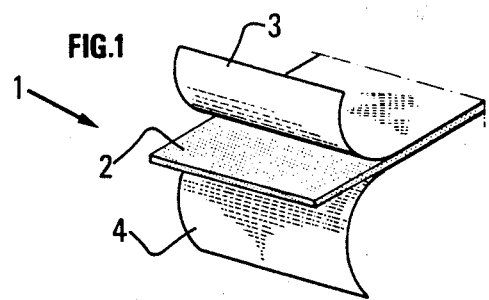
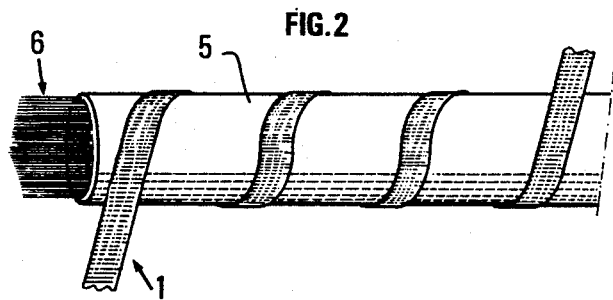
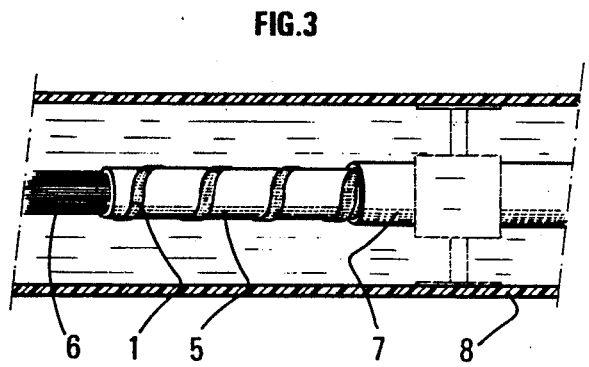
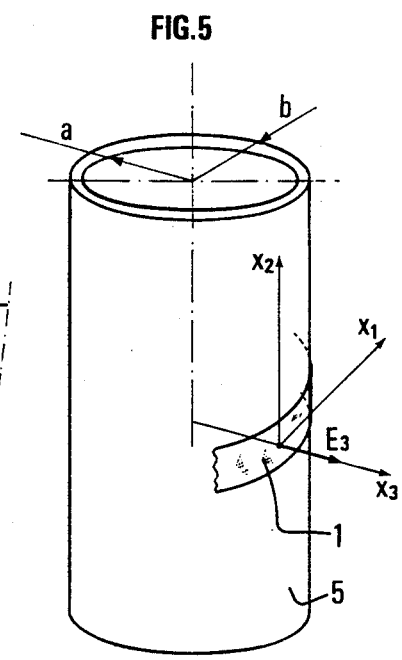
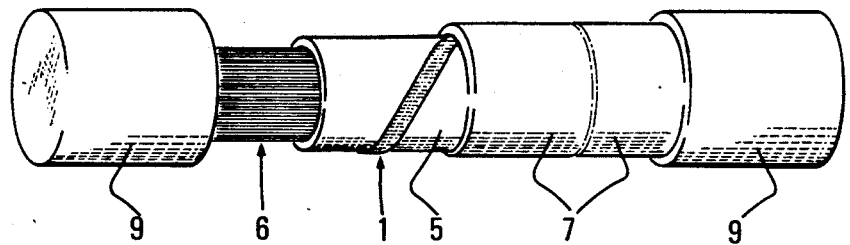

TUBULAR PIEZO-ELECTRIC SENSOR WITH HIGH SENSITIVITY

BACKGROUND OF THE INVENTION

The present invention relates to a tubular shaped piezo-electric sensor, with a high sensitivity, adapted to form continuous hydrophones of very great length while resisting appreciable variations of the hydrostatic pressure.

Tubular piezo-electric sensors of the above-mentioned type may comprise, for example, a tube made from a material having piezo-electric properties such as, for example, a polymer of the polyvinylidene fluoride type (PVF 2) with an electrode being associated on each of the faces thereof.

The inner electrode is generally formed of a metal film deposited on the inner face of the piezo-electric tube or is associated with a central core. When the central core is made from a dielectric material, the electrode may be formed by metallization of its outer surface or else by a spirally wound wire. The central core may be further made from a conducting material, for example polymer made conductive by the inclusion of metal particles, or else in the form of a rectilinear metal wire.

Sensors of the aforementioned type are disclosed in, for example, French Patent Nos. 2 145 099, the French Patent applications Nos. 87/09262 and 81/22452, the latter being published under the Nos. 2 517 155, the U.S. Pat. No. 4 568 851 or the PCT Patent application No. 86/00757.

In French Patent No. 2 145 099, a tubular piezo-electric sensor is formed of a central core around which is wound in a spiral at least one piezo-electric sensitive element. The piezo-electric sensitive element is formed of a strip of flexible piezo-electric material coated with a metal film on each of its faces. This sensor structure makes it possible to construct hydrophones of very great length which are insensitive to accelerations and flexions, and which are suitable for numerous underwater applications, particularly in geophysics. The use of sensitive elements in the form of relatively thick piezo-electric films offers undeniable economic advantages.

In an article published in the J. ACOUS. SOC. AM 68 (4), October 1980, pp 1025–1029 a cylindrical piezo-electric hydrophone is described which includes a tubular support coated with a piezo-electric film on its inner surface and/or on its outer surface and cosed at each end by a rigid cap, with an inner volume of the tubular support being filled with a gas. Such a structure has increased sensitivity because the gas-filled tubular support may be deformed under the action of the radially exerted forces and thus provides mechanical amplification. But in the field of marine applications, where the depth of use is very variable, it would reveal itself to be unfavorable. Since the inner volume of the tubular support is compressible, the tubular support would not resist very well too high a rise of the hydrostatic pressure and there would be a danger of sealing losses or breakage of the sensitive element. It should also be noted that the construction of a piezo-electric sensor with a sensitive film coating the inner surface of the tubular support is very difficult in practice if its length is very great.

In accordance with the present invention, a sensor having both a very high sensitivity and a capacity to withstand high hydrostatic pressure variations is provided which comprises at least one sensitive element made from a material having piezo-electric prperties and associated with electrodes, with the sensitive element being disposed on a tubular support.

Advantageously, according to the present invention, an inside of the tubular support contains at least one substance whose acoustic impedance is very different from that of the material forming said tubular support, so as to form an acoustic screen for the acoustic waves passing through the tubular support, and means are provided for maintaining a pressure inside the tubular support substantially equal to the static pressure prevailing outside the piezo-electric sensor.

The inside of the tubular support of the present invention contains, for example, at least one substance impregnated with a liquid. The liquid impregnated substance may advantageously be formed of a fibrous material such as, for example, glass fiber or else from a porous material.

Depending on the embodiment of the present invention, the tubular support having at least one sensitive element and the screen forming substance is disposed inside a sealed sheath transparent to the acoustic waves and filled with liquid, with respective, ends of the tubular support comprising apertures for permitting the liquid filling the sealed sheath to penetrate therein.

By virtus of use of a substance effective in very considerably attenuating the acoustic waves inside the tubular support as proposed by the present invention, the sensitivity of the piezo-electric sensor within large proportions increases. The combination of this substance with means for providing a static balance between the pressure inside the tubular support and the outside pressure, and, more particularly, a liquid impregnated fibrous or porous material substantially at the same pressure as the external medium, makes it possible to construct a very sensitive and very resistant piezo-electric sensor. Such a sensor lends itself then very well to measurements in water at very varying depths.

Since, according to the present invention, each sensitive element may be wound in a spiral about the tubular support, and since the substance forming the inner acoustic screen is easy to position, sensors of great length may be constructed at relatively low cost. Sensors of this type disposed inside a very long sheath filled with liquid make it possible, for example, to construct receiving devices for seismic prospection, underwater listening or other geophysical or oceanographic operations.

BRIEF DESCRIPTION OF THE DRAWINGS

Other features and advantages of the piezo-electric sensor of the invention will be clear from the following description of several embodiments of the present invention given by way of non-limitative example, with reference to the accompanying drawings in which:

FIG. 1 is a perspective view of a sensitive piezo-electric element in the form of a flexible strip;

FIG. 2 is a isometric view of a piezo-electric sensor comprising a flexible piezo-electric strip wound on a tubular support;

FIG. 3 is a partial isometric longitudinal cross-sectional view of one embodiment of the present invention wherein a piezo-electric sensor comprising a tubular support with a winding is included in a sheet of great length filled with a liquid;

FIG. 4 is an isometric view of another embodiment of the present invention of which a tubular support with a winding is covered by the sheets; and FIG. 5 is an isometric view of a tubular support with a portion of a piezo-electric sensor disposed thereon.

DESCRIPTION OF THE PREFERRED EMBODIMENT

Referring now to the drawings wherein like reference numerals are used throughout the various views to designate like parts and, more particularly, to FIGS. 1 and 2, according to these figures, a piezo-electric sensor in accordance with the present invention comprises a sensitive element generally designated by the reference numeral 1 including a thin substrate 2 made from a flexible material such as, for example, PVF2 or other similar plastic synthetic products, to give the thin substrate 2 piezo-electric properties, with the thin substrate 2 being coated on two-opposite faces thereof with conducting films 3, 4 forming electrodes. Filling arrangements proposed particularly from French Patent Appln. 2601132, the sensitive element 1 is wound in a spiral around the tubular support 5 and conducting rings (not shown) are disposed in a vicinity of the tubular support 5 for collecting the electric charges developed on the electrodes formed by the conducting films 3, 4 by the forces exerted.

A substance generally designated by the reference numeral 6 whose acoustic impedance is very different from that of the tubular support 5 is disposed inside the tubular support 5 so as to form a screen for the acoustic waves, and liquid is injected for filling the remaining inner space.

As shown in FIG. 3, the assembly thus formed is covered with a protective sheath 7 and disposed in a tubular casing 8 filled with liquid. In this case, the same liquid fills the inside of the tubular casing 8 and the tubular support 5 which may remain open at both its ends. The liquid may, for example, be oil or kerosene, in the case where this flexible casing forms a seismic streamer in contact with the water where it is towed immersed by a ship.

As shown in FIG. 4, the tubular support 5 contaning the screen material and filled with liquid may also be closed at its opposite ends by rigid caps 9 and simply surrounded by a protective sheath 7 so as to be used as such for certain applications.

The material forming the acoustic screen may be in the form of glass fiber cords into the thickness of which the liquid penetrtes by capillarity.

For example, open cell foams, porous materials etc. . . . or any other substance whose acoustic impedance is very different form that of the material forming the tubular support 5 may also be used, and care should be taken that the screen material is distributed homogeneously throughout the section of the tubular support 5 and also, when filling it with liquid, to make sure that the air is driven out so as to obtain an homogeneous acoustic screen.

The piezo-electric sensor thus formed operates perfectly wheatever the static pressure which is applied externally thereto. All the sealing defects and the risk of deterioration of the sensitive elements are avoided, which may occur in the case where the support contains a compressible substance such as a gas.

Experience has shown that the use, in combination with the liquid, of an acoustic screen material increases, in surprising proportions, the sensitivity of the sensor to the dynamic pressure variations with respect to the case where the tubular support only contains liquid. It has also been observed that a good homogeneity of the acoustic screen makes it possible to obtain a smooth frequency response curve which extends down as far as very low frequencies, of the order of a few Hertz.

The sensitivity of the piezo-electric sensor may be further improved by a judicious choice of Young's modulus for the materials forming the piezo-electric ribbon forming the sensitive element and the tubular support 5 and also of the dimensions thereof as will be seen hereafter.

Considering a tubular support such as shown in FIG. 5, with an external radius b and of thickness (b-a), on the surface of which a piezo-electric film is wound of small thickness $h_p$ such as film 1. The sensitivity $M_O$ of the sensitive element (expressed in volts/bar) is equal to the ratio of the electric voltage $e_O$ which appears between its electrodes and the presure $P_O$ applied. It is also assumed that the electric field $E_3$ in the radial direction $x_3$ perpendicular to the plane of the sensitive element does not substantially vary in its thickness $h_p$ and therefore that the electric voltage $e_O$ appearing between the electrodes in equal to $h_p E_3$. The electric field $E_3$ is expressed as a linear combination of the forces $T_{1P}$, $T_2P$ and $T_{3P}$ applied to the sensitive element along three axes, the previously defined axis $x_3$ and two axes $x_1$ and $x_2$ in the tangential plane to the tubular support 5. It is deduced therefrom that the sensitivity of the sensitive element is expressed by the following relationship:

$$M_0 = h_p \left( g_{31} \frac{T_{1P}}{P_0} + g_{32} \frac{T_{2P}}{P_0} + g_{33} \frac{T_{3P}}{P_0} \right) \quad (1)$$

where $g_{31}$, $g_{32}$ and $g_{33}$ are the piezo-electric coefficients of the substrate.

In relationship (1) it is assumed that the force $T_{3P}$ along the radial axis $x_3$ is equal to the applied pressure $P_O$.

By applying Hooke's laws and starting from the justified assumption that the relative expansion of the sensitive element along the two axes $x_1$, $x_2$ of the tangential plance, in response to a pressure $P_O$ exerted along axis $x_3$, are the same as the expansion undergone at the periphery of the tubular support along these same two axes, the following relationships can be established:

$$S = \frac{T_{1P}}{P_0} = \frac{n_p}{1 - n_p} +$$

$$\frac{E_p}{E} \frac{-2 r^2 n_p (2n + 1) + r^2 (2n_p^2 - n_p + 2n + 1)}{(1 - r^2)(2n_p - 1)(n_p + 1)(1 - n_p)} +$$

$$\frac{E_p}{E} \frac{n_p (4n\ n_p - 2n_p + 2n - 1) + 1 - 2n}{(1 - r^2)(2n_p - 1)(n_p + 1)(1 - n_p)}$$

$$T = \frac{T_{2P}}{P_0} = \frac{n_p}{1 - n_p} +$$

$$\frac{E_p}{E} \frac{-2 r^2 n_p (2n\ n_p + n_p - n - 1) + r^2 (n_p - 1)}{(1 - r^2)(2n_p - 1)(n_p + 1)(1 - n_p)} +$$

$$\frac{E_p\ n_p (4n\ n_p - 2n_p + 2n - 1) + 1 - 2n}{E (1 - r^2)(2n_p - 1)(n_p + 1)(1 - n_p)}$$

where:

$n_p$ = the Poisson coefficient of the sensitive element 1;

n = the Poisson coefficient of the tubular support 5;
$E_p$ = Young's modulus of the sensitive element 1;
E = Young's modulus of the tubular support 5; and
r = a ratio a/b between an inner radius a and an outer radius b of the tubular support 5.

A study of the variation of sensitivity $M_O$ as a function of the different parameters appearing in the above relationships shows that it will be all the better the higher the ratio $E_p/E$ and the closer the ratio r to unity.

Experimental verifications have given results in perfect agreement with the above relationships such as they have been established. The sensitivity of the piezo-electric sensor is in particular improved if the Yount's modulus of the sensitive element 1 is much higher than that of the tubular support 5 and also if the thickness of the latter is fine (r≠1).

The use of the structure shown in FIGS. 1 to 4 optimized in so far as the parameters having an influence on the sensitivity are concerned, makes it possible to increase the latter to values of several tens of volts per bar of applied pressure (typically 50 V/b) with a passband going down as far as very low frequencies and a very smooth frequency response.

The piezo-electric sensor of the invention lends itself well as a seismic receiver within the field of seismic marine prospection operations and, more generally, for geophysical or oceanographic measurements.

Without departing from the scope of the invention, a sensitive element may be used different from that used in the embodiments described, a tubular sensitive element may for example be used disposed against the outer wall of the support.

What is claimed is:

1. A tubular piezo-electric sensor comprising at least one sensitive element made from a substrate having piezo-electric properties and associated with electrodes, said sensitive element being disposed on a hollow tubular support, means impregnated with a fluid disposed inside said hollow tubular support for forming an coustic screen for highly dampening acoustic waves passing through said tubular support, and means for maintaining a pressure inside the tubular support substantially equal to a static pressure prevailing outside the tubular piezo-electric sensor.

2. The piezo-electric sensor as claimed in claim 1, wherein said means impregnated with a liquid includes a fibrous material.

3. The piezo-electric sensor as claimed in claim 2, wherein said means impregnated with a fluid includes a porous material.

4. A piezo-electric sensor for sensing acoustic waves in a medium with a variable static pressure comprising at least one sensitive element made from a material having a piezo-electric properties and provided with electrodes, said sensitive element being disposed on a tubular hollow support, means impregnated with a fluid disposed in said hollow tubular support for forming an acoustic screen for highly dampening acoustic waves passing inside hollow tubular support, and means for maintaining a pressure inside the tubular support substantially equal to the static pressure prevailing outside the tubular piezo-electric sensor, and wherein said means impregnated with a liquid includes a fibrous material made from glass fiber.

5. A piezo-electric sensor for sensing acoustic waves in a medium with a variable static pressure comprising at least one sensitive element made from a material having piezo-electric properties and provided with electrodes, said sensitive element being disposed on a tubular hollow-support, means impregnated with a fluid disposed in said hollow tubular support for forming an acoustic screen for highly dampening acoustic waves passing inside said hollow tubular support, means for maintaining a pressure inside the hollow tubular support substantially equal to the static pressure prevailing outside the piezo-electric sensor, a sealed casing means transparent to the acoustic waves and filled with a liquid for accommodating said hollow tubular support, aperture means provided in respective ends of said hollow tubular support for permitting the liquid filling the sealed casing means to penetrate therein.

6. The piezo-electric sensor as claimed in claim 5, wherein said sensitive element is in the form of a thin film.

7. The piezo-electric sensor as claimed in claim 6, comprising at least one sensitive element helically wound about the hollow tubular support.

8. The piezo-electric sensor as claimed in claim 6, comprising two sensitive elements helically wound in opposite directions about the hollow tubular support.

9. A piezo-electric sensor for sensing acoustic waves in a medium with a variable static pressure comprising at least one sensitive element made from a substrate having piezo-electric properties and provided with electrodes, said sensitive element being disposed on a tubular hollow support, means impregnated with liquid disposed in said hollow tubular support for forming an acoustic screen for highly dampening acoustic waves inside said hollow tubular support, means for maintaining a pressure inside the hollow tubular support substantially equal to the static pressure prevailing outside the piezo-electric sensor, and wherein the Young's modulus of material forming the hollow tubular support is chosen so as to be very much less than a corresponding Young's modulus of the substrate of the sensitive element thereby increasing sensitivity of the sensor.

10. The piezo-electric sensor as claimed in claim 9, wherein a thickness of said hollow tubular support is very thin with respect to a diameter thereof.

11. The piezo-electric sensor as claimed in claim 9, wherein a ratio between an inner radius and an outer radius of the hollow tubular support is substantially equal to 1.

12. A tubular piezo-electric sensor for sensing acoustic waves in a medium with a variable static pressue comprising at least one sensitive element made from a substrate having piezo-electric properties and provided with electrodes, said sensitive element being disposed on a tubular hollow-support, means impregnated with a liquid disposed in said hollow tubular support for forming an acoustic screen for the acoustic waves passing through the hollow tubular support, said means impregnated with a liquid having at least one of an acoustic coefficient and absorption coefficient differing from that of material forming said hollow tubular support and said liquid, and means for maintaining a pressure inside the hollow tubular support substantially equal to a static pressure prevailing outside the piezo-electric sensor, and wherein the Young's modulus of the material forming the hollow tubular support is very much less than a corresponding Young's modulus of the substrate of the sensitive element thereby increasing sensitivity of the sensor.

* * * * *